July 12, 1927.

W. D. STARRETT

SLOPE STAKE CALCULATOR

Filed July 23, 1923

INVENTOR
WENDELIN D. STARRETT
BY
*Harry C. Schroeder*
ATTORNEY

July 12, 1927.

W. D. STARRETT 1,635,646

SLOPE STAKE CALCULATOR

Filed July 23, 1923

INVENTOR
WENDELIN D. STARRETT
BY
Harry P. Schroeder
ATTORNEY

July 12, 1927.

W. D. STARRETT

SLOPE STAKE CALCULATOR

Filed July 23, 1923

INVENTOR
WENDELIN D. STARRETT

BY
ATTORNEY

Patented July 12, 1927.

1,635,646

UNITED STATES PATENT OFFICE.

WENDELIN D. STARRETT, OF OAKLAND, CALIFORNIA.

SLOPE-STAKE CALCULATOR.

Application filed July 23, 1923. Serial No. 653,213.

My invention is an improved calculator particularly useful in cross-sectioning or setting of slope stakes for roadbeds, ditches, and so forth.

The method of cross-sectioning is well-known and consists of establishing the grade rod for the particular station to be cross-sectioned, then subtracting this grade rod from the surface rod to give the cut or fill. These calculations were done mentally, and consequently there was quite a possibility of error. In ditch work, two grade rods are used and the possibility of error is consequently increased. After the amount of cut or fill has been determined, the position of the slope stake is determined by multiplying the cut or fill by the rate of side slope (that is, 1½:1, 1:1, etc.), and adding it to half the width of the roadbed.

The object of my invention is to provide a calculator which will give the above mentioned results with a single setting. The answer being given directly in feet and fractions of a foot.

Another object of my invention is to provide a means whereby either a cut or a fill may be figured on the calculator. This is accomplished by reversing the sequence of the figures in the outer disc.

A still further object is to provide a means whereby the range of the calculator may be increased beyond the actual figures on the dials.

In the annexed drawings I have illustrated the preferred form of my invention, but it may also be embodied in other forms and in this application I desire to cover my invention in whatever form it may be embodied.

Referring to the drawings.

Figure 1:
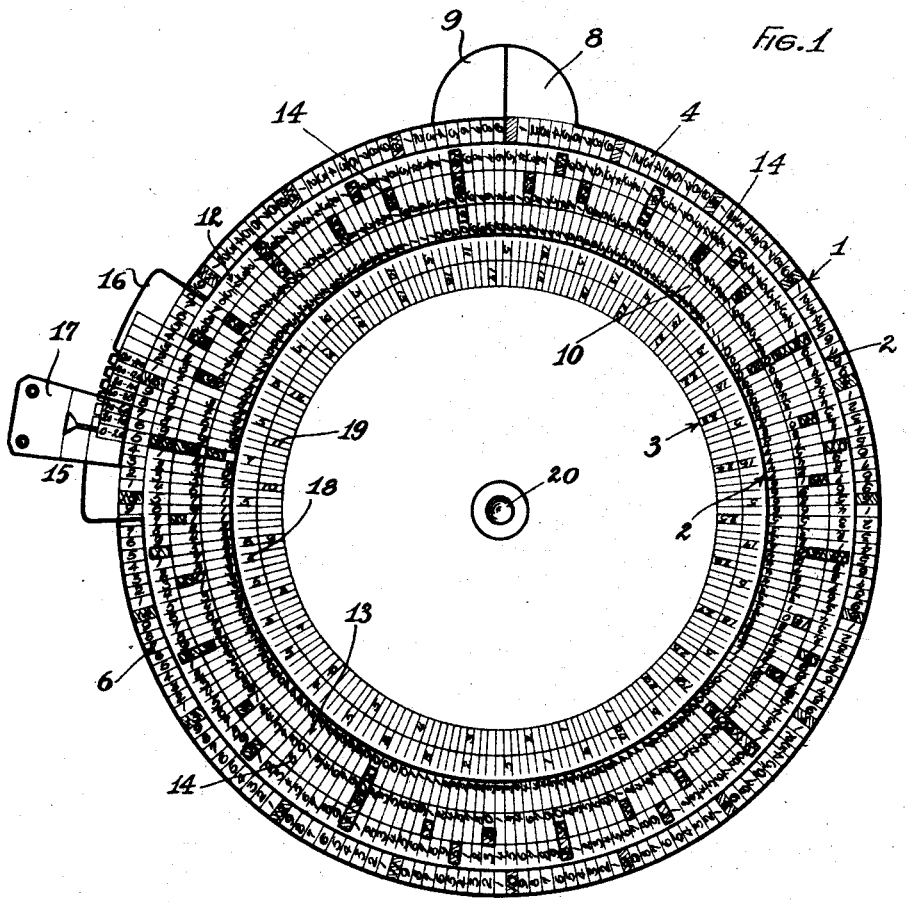
Figure 1 is a plan view of my calculator.

Referring more particularly to the drawing, my calculator consists primarily of three elements 1, 2 and 3, which may be termed the surface rod element, the grade rod and distance element, and the second grade rod and distance element, respectively.

The element 1 comprises two discs 4 and 5, each of which is formed as a spiral, and is threaded one within the other. A scale 6 and 7 is placed upon the upper surfaces of the members 4 and 5 respectively, the scale 6 being arranged in increasing sequence clockwise, while the scale 7 is arranged in increasing sequence counter-clockwise. Tabs 8 and 9 are formed on the discs 4 and 5 respectively, whereby the same are rotated. By means of these tabs the discs 4 and 5 may be manipulated so that the one covers the scale on the other, thereby leaving one of the scales 6 or 7 visible, according to the result desired, that is, a cut or a fill, which will be further explained.

The element 2 is formed with two superimposed dials 10 and 11, the former being the upper and the latter being rotatably mounted below it. As shown, there are three scales upon the dials 10 and 11, the outer scale 12 being the grade rod, and the inner scales 13 being the distances from the edge of the bed to the toe of the fill or edge of cut. I have shown the scales 13 as slope rates of 1½:1 and ¼:1 but any desired rate may be used.

Apertures 14 are formed in the dial 10 in the scales 12 and 13, through which the figures on the member 11 are visible. These apertures are spaced to indicate the feet, and the fractions of the foot are placed upon the member 10. As shown, there are twenty main divisions on the discs, that is, the calculator will read directly to twenty feet, if the cut or fill is greater than this the dial 11 is rotated under the dial 10 and a new set of figures will appear under the apertures 14, that is, from twenty to forty, or further from forty to sixty, and so forth, as far as desired.

The dial 11 is set in its position by means of a suitable lock 15, which consists of an arcuate rack 16 formed on the dial 10 and a finger 17 formed on the dial 11 which engages the various teeth in the rack 16 and thus holds the member 11 in the desired position.

The inner element 3 has two dials 18 and 19 formed upon it, which indicate the second grade rod and the distance from the edge of the bank to the toe of the fill respectively. This is only used in ditch work where a bank is to be thrown up to form one or two sides of the ditch.

Figure 2:
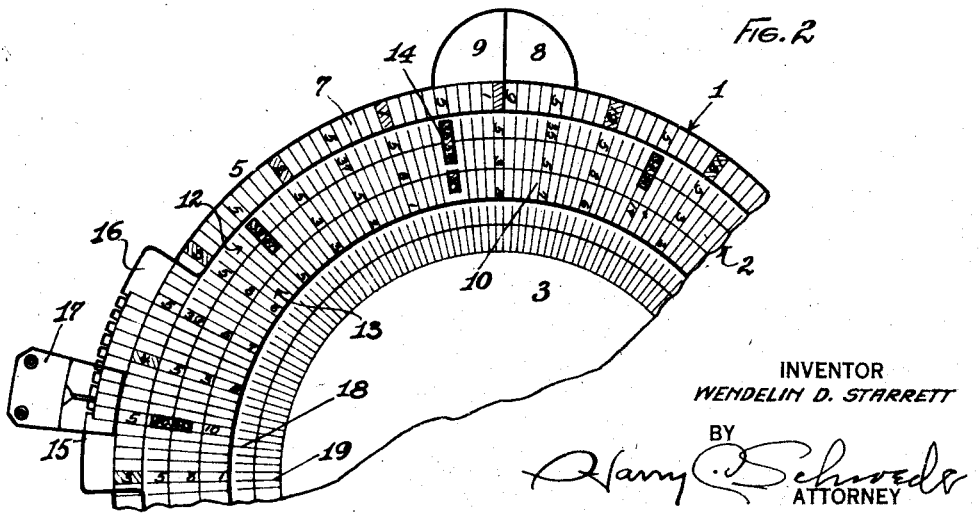
Figure 2 is a fragmentary diagrammatic view of my calculator.
Figure 3:
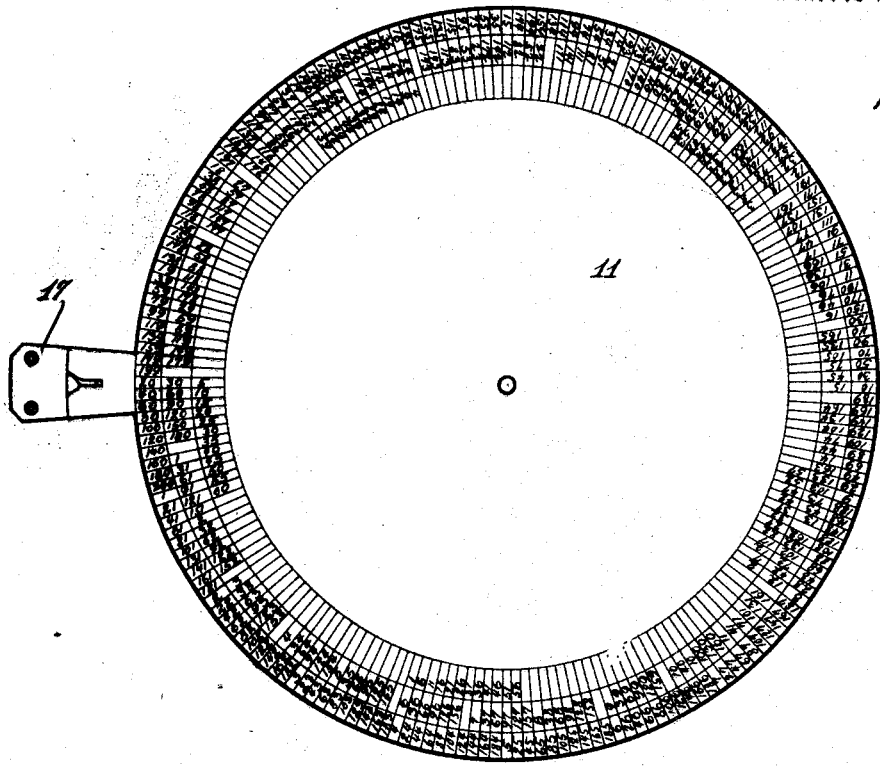
Figure 3 is a plan view of the range control disc.
Figure 4:
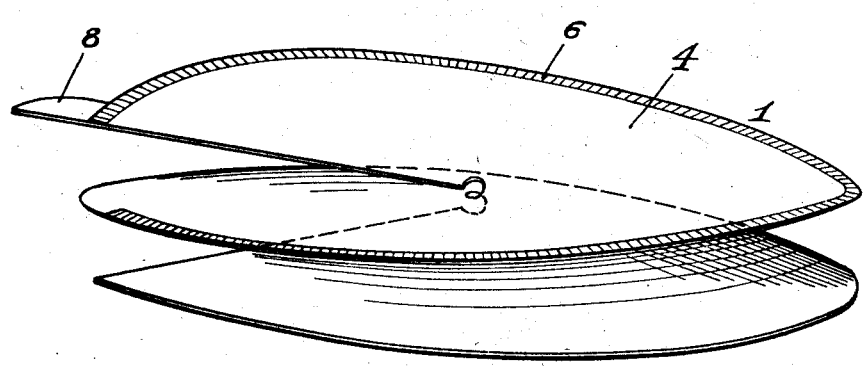
Figure 4 is a perspective view of one of the outer discs.
Figure 5:
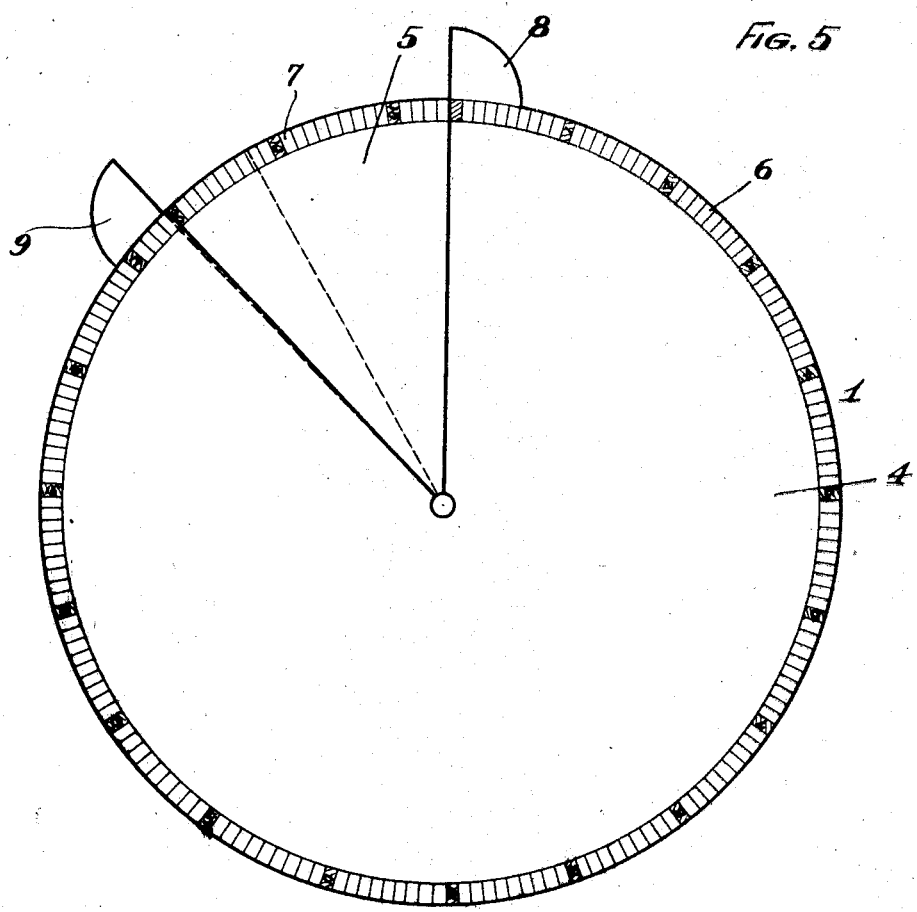
Figure 5 is a plan view of the outer discs.

The elements 1, 2 and 3 are all pivoted at their centers on a suitable pin 20. In Figures 1 and 2 I have shown two different settings for my calculator, that in Figure 1 being for a cut and Figure 2 for a fill. Referring to Figure 1, after the instrument was set up it was found that the grade rod for that station was 15.5 feet, therefore 15.5 on the dial 12 is set at the 0 mark on the disc 1. The instrument is now set and no further settings are necessary. The surface rods are now read upon the scale 6 and the amount of cut is read upon the scale 12, and opposite this reading on the scales 13 is shown the distance from the edge of the road bed to the surface rod; that is, for a rod reading of 4 feet the cut is 11.5 feet and the distance is 17.3 feet for a slope rate of 1½:1 or 2.8 feet for a rate of ¼:1. It will be understood by one well versed in the art, that a number of surface readings must be taken before the edge of the cut is found and the slope stake set. This naturally is done in the usual way.

Figure 2 is set for a fill and the scale 7 is exposed; also the dial 11 has been shifted to increase the range of the disc 2 from 20 feet to 40 feet. The grade rod is 35.5 feet which is set on the 0 mark of the scale 7. For a surface rod reading of 3 feet, the fill is 38.5 feet and the distance from the edge of the road bed to the rod is 57.8 feet.

Referring again to Figure 1, if it is desired to calculate distance in ditch surveying, suppose the depth of the ditch is 7 feet, subtract 7 from the grade rod 15.5 which leaves 8.5 feet for the second grade rod on top of the bank. Now set 0 on the dial 18 opposite 8.5 on the scale 6 and the calculator is set. All readings are read on the scale 6 and followed to the elements 2 and 3 for the results desired. Again for a rod reading of 10 feet on dial 3, the answer is cut 1.5 feet, distance 2.3 feet, plus the constant distance which is from the center of the road to the edge of the bank.

Having described my invention, I claim:

1. In a calculator of the character described, a dial, and two discs presenting superimposed scales in adjacent relation to the dial, the two discs being inter-related to allow either of the scales to be brought into view for reading with the dial.

2. In a calculator of the character described, a dial, and two discs presenting superimposed scales in adjacent relation to the dial, the scale on one of the discs being in reverse sequence to that of the other and the two discs being inter-related to allow either of the scales to be brought into view for reading with the dial.

3. In a calculator of the character described, a dial and two revolvable discs presenting scales in adjacent relation to the dial, the two discs being spiral and threaded one into the other so as to allow either of the scales to be brought into view for reading with the dial.

4. In a calculator of the character described, a dial and two revolvable discs presenting scales in adjacent relation to the dial, the two discs being spiral and threaded one into the other so as to allow either of the scales to be brought into view for reading with the dial and the scale on one of the discs being in reverse sequence of that of the other.

5. In a calculator of the character described, two superimposed spiral elements threaded into one another, each of the elements having a scale in reverse sequence of that of the other so as to allow either scale to be brought into view by a turning motion.

6. In a calculator of the character described, a dial formed with a circular series of spaced openings and a second dial below the same and revolvable thereto having successive ranges of consecutive figures inter-related so that a new range of consecutive figures is presented to view through the openings in the first dial on each turning movement of a dial.

In testimony whereof I affix my signature.

WENDELIN D. STARRETT.